Nov. 13, 1956 W. L. MORRISON 2,770,354
DISTRIBUTOR FAN COMPOSTER
Filed Jan. 27, 1954 2 Sheets—Sheet 1

Inventor,
WILLARD L. MORRISON
Attorney,
PARKER & CARTER

Nov. 13, 1956  W. L. MORRISON  2,770,354
DISTRIBUTOR FAN COMPOSTER
Filed Jan. 27, 1954  2 Sheets-Sheet 2

Inventor,
WILLARD L. MORRISON

Attorney,
PARKER & CARTER

2,770,354
DISTRIBUTOR FAN COMPOSTER

Willard L. Morrison, Lake Forest, Ill., assignor to Chicago Stock Yards Compost Company, Chicago, Ill., a corporation of Illinois Application January 27, 1954, Serial No. 406,509

12 Claims. (Cl. 198—128)

My invention relates to improvements in composting machines for animal manure and the like.

One object of my invention is to provide in a composting machine means for comminuting and distributing raw manure and manure in process of digestion in a composting chamber.

My invention is especially applicable to the type of composter where the manure or similar material undergoing composting or digestion is contained in a vertical closed chamber, of substantial depth and wherein air and moisture to promote microbial life may be forced upwardly through the column of manure and wherein, as the digestion continues, lower layers of the column are successively or continually removed, aerated, comminuted and returned to the top of the column for recycling.

If a satisfactorily stable and merchantable product is to be obtained it is essential that all the material in the mass undergoing composting be supplied with the air and moisture necessary to promote the activity of aerobic microbia which accomplish the digestion or composting process.

Especially in the early stages of the composting process the animal manure undergoing treatment may retain its original custard-like consistency. Under these circumstances even if moisture laden air is forced upwardly through the column many compact, dense and sticky islands of material distributed throughout the column will not be adequately penetrated by the air and the microbia therein contained will not be able to adequately perform their digestive function.

In order that all the manure, every particle, be digested and this is essential in the production of a commercial aritcle, the material as it is recirculated must be aerated, comminuted and distributed over the top of the mass to insure uniform digestion throughout the mass.

The present invention, therefore, relates to a particular arrangement for comminuting and distributing the manure from whatever source supplied to the top of the mass for digestion.

Other objects will appear from time to time throughout the specification and claims.

My invention is illustrated more or less diagrammatically in the accompanying drawings, wherein—

Like parts are indicated by like characters throughout the specification and drawings.

Figure 1:
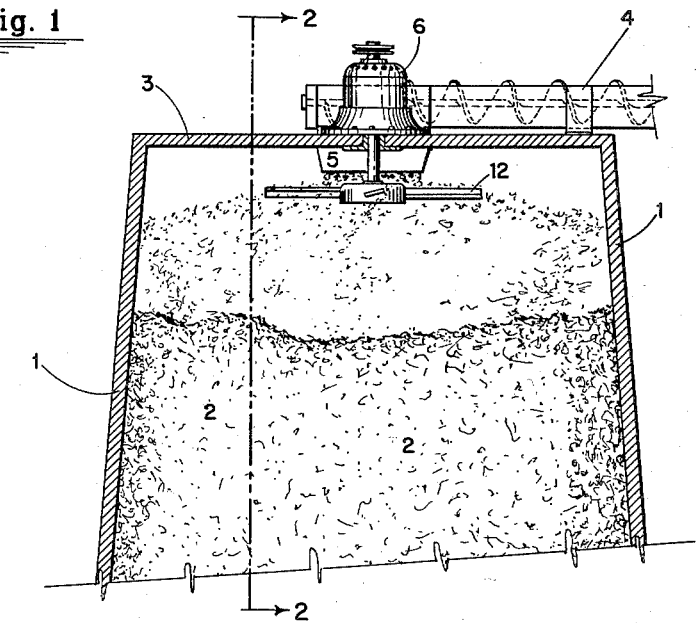
Figure 1 is a vertical section with parts omitted through the top of a composter utilizing my invention.

1 is a vertically disposed composting chamber or chimney, the cross sectional area of which increases downwardly. The lower portion of the chimney forming no part of the present invention is not specifically illustrated. Suffice it to say that the column of manure is supported not by the chimney walls but by suitable supporting means at the bottom, so arranged that manure may be withdrawn from the bottom of the column for discharge as a finished product, or for return to the top of the column for recirculation. 3 is the roof of the chimney and any suitable air duct not here illustrated may, if desired, permit air movement into or out of the chimney above the manure column. 4 is a screw conveyor supported on the roof adapted to receive manure from any suitable source and discharge it through the chute 5 into the chimney above the manure mass. 6 is a motor carried by the chimney 3, driving through a belt 7, a fan shaft 8 carried in the bearing sleeve 9 supported against longitudinal movement by the collar 10 and carrying at its lower end a fan hub 11 from which extend radially, blades 12. The blades extend outwardly into line with the chute 5.

Figure 2:
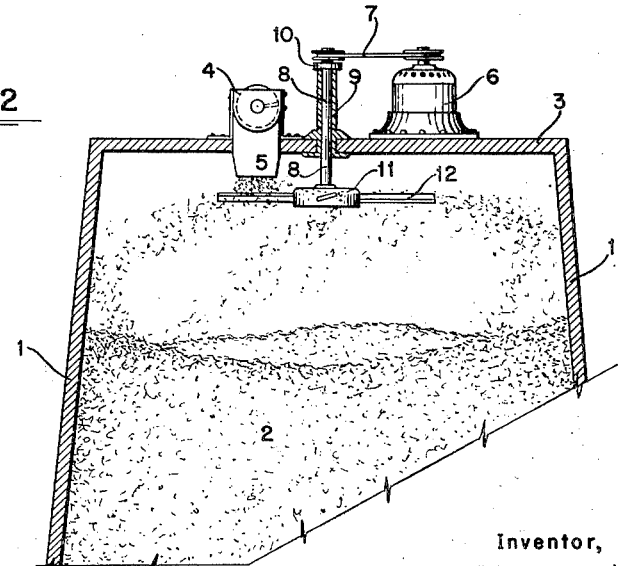
Figure 2 is a section along the line 2—2 of Figure 1.

As the fan is rotated and as the screw conveyor supplies manure to the chamber, the manure is aerated, broken up and distributed by the fan blades 12 so that the comminuted, aerated, manure is spread over the top of the column in a generally uniform manner. The fan blades thus acting simultaneously to aerate, comminute and distribute the stream of manure as it is supplied to the chimney, this action being illustrated particularly in Figures 1 and 2.

Figure 3:
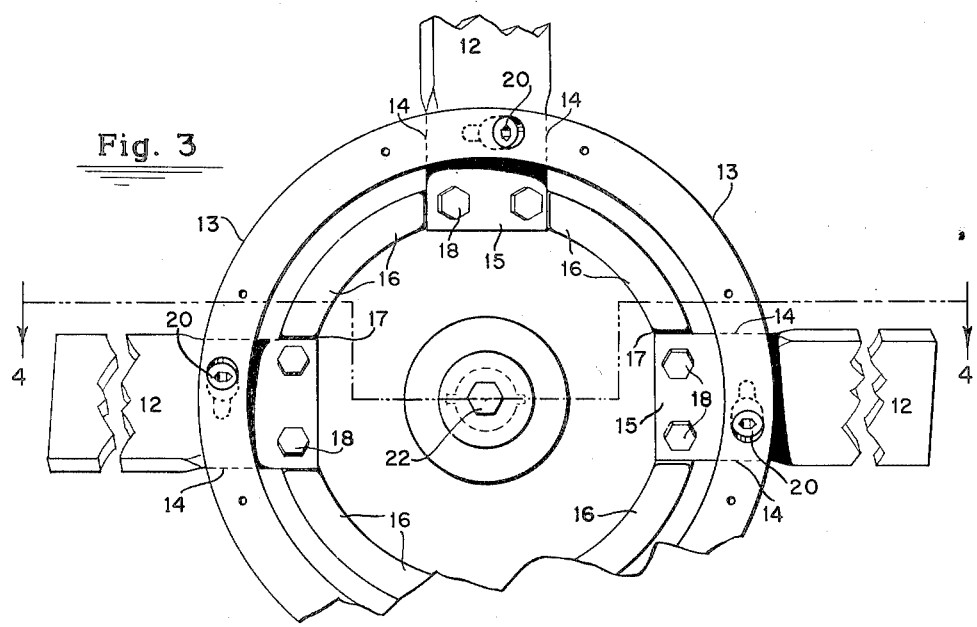
Figure 3 is a plan view of part of the comminuting and distributing fan.
Figure 4:
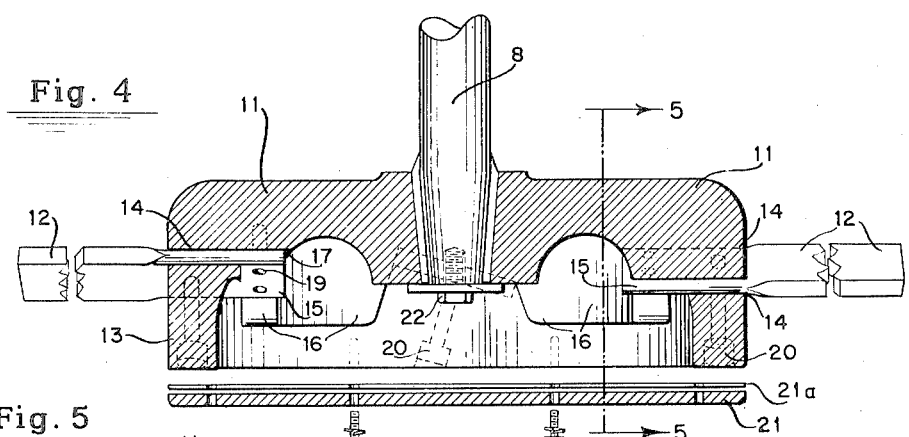
Figure 4 is an exploded section along the line 4—4 of Figure 3.
Figure 5:
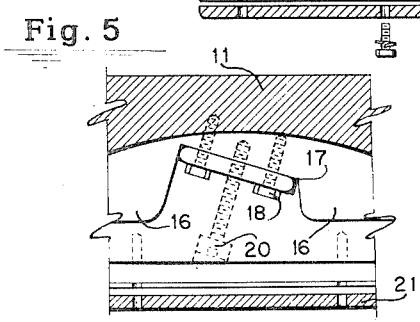
Figure 5 is section along the line 5—5 of Figure 4.

Referring now to Figures 3 and 4, the fan hub 11 has a downwardly extending skirt 13 through which are formed a plurality of radially disposed axially inclined apertures 14 adapted to receive the inner ends 15 of the fan blades 12. Concentric with the skirt 13, spaced inwardly from the inner periphery thereof, is a ring 16 cut away to provide seats 17 in alignment with the apertures 14 so that the inner ends of the fan blades project inwardly through the apertures 14 and rest upon the seats 17. Cap screws 18 passing through the apertures 19 in the inner ends of the blades are threaded in the ring 16 and hold the fan blades against centrifugal discharge. Cap screws 20 are threaded in the inner ends 15 of the fan blades 12 and with the cap screws 18 provide a three-point attachment for each fan blade. The cap screws 20 have their heads socketed in the skirt 13 so that the filler plate 21 and packing washer 21a masks all of the cap screws as well as the holding nut 22 which holds the hub 11 on the shaft 8. The number of the fan blades may vary depending upon the circumstances. In one installation eight blades have been used. In some circumstances four might be satisfactory and under other circumstances, the number might be further increased.

The screw conveyor is so placed at its discharge end with respect to the hub material, be it raw manure or manure partially digested, falls on the blades or on the upper closed portion of the hub. As the fan rotates at high speed the blades intersect the line of fall of the material dropping from the screw conveyor and acting as the hammer or a hammermill breaks up and distributes the material entering the digesting chamber.

Since the fan blades travel at very high speed, they break up effectively any compacted masses of the material and since their speed is high, centrifugal force insures that little if any material will adhere, no matter how sticky it is, for any length of time to the blade.

No matter how careful the selection of material fed to the apparatus may be there will also be a substantial amount of tramp iron, stones, wood and other foreign matter which together with the corrosive effect of the juices in the manure will cause deterioration of the fan blade. The arrangement above disclosed is one which makes it quite easy to replace a new blade when one blade is worn out.

The arrangement of the three cap screws, perpendicular as their axes are to the plane of the blade, provides a positive interlock to positively prevent escape of the blade by centrifugal force from the hub when the fan is rotating but since the blade is apertured and smooth on its surfaces it can easily be inserted or removed.

The fact that the inner cap screws pull the blade upwardly against the abutment and the other cap screw draws the blade in the opposite direction provides an added interlock for the blade so as to minimize the likelihood of dangerous vibration starting up at the point of contact between the blade and the hub.

I claim:

1. A fan including a hub, having a plurality of radial slots therein, inclined to a plane perpendicular to the axis of rotation of the hub, a removable fan blade perforate at its inboard end, socketed in each slot, a cap screw perpendicular to the plane of and extending through a perforation in the blade adapted to exert a pressure tending to displace such end in one direction and a cap screw perpendicular to the plane of and extending through a perforation in the blade tending to displace such end in the opposite direction.

2. A fan including a hub, having a plurality of radial slots therein, inclined to a plane perpendicular to the axis of rotation of the hub, a removable fan blade perforate at its inboard end, socketed in each slot, a cap screw perpendicular to the plane of and extending through a perforation in the blade adapted to exert a pressure tending to displace such end in one direction and a cap screw perpendicular to the plane of and extending through a perforation in the blade tending to displace such end in the opposite direction, a removable closure for the hub adapted to mask the inboard ends of the blades and the cap screws.

3. In a fan, a bell having a plurality of radial slots through the wall thereof, inclined to a plane perpendicular to the axis of the bell, an abutment inside the bell associated with each slot having a surface in alignment with one wall of each slot, a flat, metal, removable fan blade perforate at its inboard end and of such size as to make a snug working fit with and to penetrate each slot and rest against the inclined face of the abutment, the abutment being threaded perpendicular to the inclined face thereof, a cap screw entering through the blade and threaded in the abutment, adapted to press one side of the inboard end of the fan blade against the face of the abutment.

4. In a fan, a bell having a plurality of radial slots through the wall thereof, inclined to a plane perpendicular to the axis of the bell, an abutment inside the bell associated with each slot having a surface in alignment with one wall of each slot, a flat, metal, removable fan blade perforate at its inboard end and of such size as to make a snug working fit with and to penetrate each slot and rest against the inclined face of the abutment, the abutment being threaded perpendicular to the inclined face thereof, a cap screw entering through the blade and threaded in the abutment, adapted to press one side of the inboard end of the fan blade against the face of the abutment, a cap screw socketed in the wall of the bell in threaded relation with an aperture in the blade adapted to press the opposite side of the blade against the opposite side of the slot.

5. A fan including a ball-like hub apertured to receive and be rigidly fastened to a drive shaft and having a skirt extending laterally from the body of the hub and encircling the drive shaft, a plurality of inclined slots extending through the skirt, an abutment inside the hub having an inclined surface parallel with and in alignment at one side of each slot, a removable fan blade comprising a flat, elongated, metallic member, the dimensions at the inboard end of which are such as to make a working fit with and permit the inboard end of the blade to extend through the slot in the skirt to rest upon the abutment, the blade being perforate at its inboard end, a cap screw extending through a perforation in the blade and threaded in the abutment, a cap screw perpendicular to the blade contained within the skirt and in threaded relationship with the blade.

6. A fan including a hub having a rim parallel with and encircling the axis thereof to define a bell-shaped housing, a plurality of radial slots extending through the rim and inclined to a plane perpendicular to the axis of the housing, removable fan blades extending inwardly through said slots, removable blade locking means contained within the housing, a shaft extending into the housing along the axis thereof, means for locking the housing on the shaft and a removable closure for the bell masking said locking means.

7. A fan including a hub having a rim parallel with and encircling the axis thereof to define a bell-shaped housing, a plurality of radial slots extending through the rim and inclined to a plane perpendicular to the axis of the housing, removable fan blades extending inwardly through said slots, removable blade locking means contained within the housing, means for locking the housing on the shaft and a removable closure for the bell masking said locking means.

8. Means for locking a removable fan blade to a support including spaced cap screws extending in the same direction from the support, one screw being threaded in the support to exert pressure on the blade in one direction, the other screw being threaded in the blade to exert pressure on the blade in the opposite direction.

9. Means for locking a removable fan blade to a support including spaced cap screws extending in the same direction from the support, one screw being threaded in the support to exert pressure on the blade in one direction, the other screw being threaded in the blade to exert pressure on the blade in the opposite direction, the fan blade being socketed in the support whereby it may move in a longitudinal direction only with respect to the support.

10. Means for locking a removable fan blade to a support including spaced pressure applying members both on the same side of and extending in the same direction from the support, one member being adapted to apply pressure to the blade along lines generally perpendicular to the plane thereof in one direction, the other being adapted to apply pressure to the blade along lines generally perpendicular thereto in the opposite direction.

11. A fan including a hub, a skirt extending axially from and encircling one side of the hub, a plurality of radial slots extending through the skirt inclined to the plane perpendicular to the axis of rotation of the hub, there being an abutment adjacent the inner periphery of the skirt having an inclined surface in general alignment with each slot, the abutment being integral with the hub and extending inwardly from the skirt toward the center of rotation, a fan blade extending inwardly through and closely fitting the slot, resting against the abutment, the inboard end of the blade being apertured, a cap screw threaded in the abutment adapted to hold the inboard end of the fan blade against the abutment, the skirt being apertured, a cap screw in the skirt penetrating the blade and adapted to draw the inboard end of the blade within the skirt in the opposite direction against the face of the slot opposed to the surface of the abutment.

12. A fan including a hub, a skirt extending axially from and encircling one side of the hub, a plurality of radial slots extending through the skirt inclined to a plane perpendicular to the axis of rotation of the hub, there being an abutment adjacent the inner periphery of the skirt having an inclined surface in general alignment with each slot, the abutment being integral with the hub and extending inwardly from the skirt toward the center of rotation, a fan blade extending inwardly through and closely fitting the slot, resting against the abutment, the inboard end of the blade being apertured, a cap screw threaded in the abutment adapted to hold the inboard end of the fan blade against the abutment, the skirt being apertured, a cap screw in the skirt penetrating the blade and adapted to draw the inboard end of the blade within the skirt in the opposite direction against the face of the slot opposed to the surface of the abutment, a flat cover plate resting upon the skirt, masking the cap screws and inboard ends of the fan blades and means for removably holding the cover plate in such masking position.

References Cited in the file of this patent

UNITED STATES PATENTS

| | | |
|---|---|---|
| 1,279,381 | Viviano | Sept. 17, 1918 |
| 1,514,246 | Assala | Nov. 4, 1924 |
| 1,729,341 | Johnson | Sept. 24, 1929 |
| 2,411,143 | Allzier | Nov. 19, 1946 |

FOREIGN PATENTS

| | | |
|---|---|---|
| 693,856 | France | Sept. 2, 1930 |
| 614,074 | Great Britain | Dec. 9, 1948 |